(12) United States Patent
Panusopone et al.

(10) Patent No.: US 10,742,979 B2
(45) Date of Patent: Aug. 11, 2020

(54) NONLINEAR LOCAL ACTIVITY FOR ADAPTIVE QUANTIZATION

(71) Applicant: ARRIS Enterprises LLC, Suwanee, GA (US)

(72) Inventors: Krit Panusopone, San Diego, CA (US); Limin Wang, San Diego, CA (US); Yue Yu, San Diego, CA (US); Seungwook Hong, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/385,998

(22) Filed: Dec. 21, 2016

(65) Prior Publication Data

US 2018/0176564 A1   Jun. 21, 2018

(51) Int. Cl.
| | | |
|---|---|---|
| H04N 7/12 | (2006.01) | |
| H04N 11/02 | (2006.01) | |
| H04N 11/04 | (2006.01) | |
| H04N 19/124 | (2014.01) | |
| H04N 19/14 | (2014.01) | |
| H04N 19/176 | (2014.01) | |

(52) U.S. Cl.
CPC .......... *H04N 19/124* (2014.11); *H04N 19/14* (2014.11); *H04N 19/176* (2014.11)

(58) Field of Classification Search
USPC .................................................. 375/240.03
See application file for complete search history.

(56) References Cited

U.S. PATENT DOCUMENTS

| | | | | |
|---|---|---|---|---|
| 6,208,689 | B1* | 3/2001 | Ohira | H04N 19/159 375/240.03 |
| 8,115,804 | B2* | 2/2012 | Yang | H04N 19/597 348/47 |
| 8,446,949 | B2* | 5/2013 | Byeung Woo | H04N 19/46 375/240.03 |
| 2008/0117977 | A1* | 5/2008 | Lee | H04N 19/56 375/240.16 |
| 2012/0195378 | A1* | 8/2012 | Zheng | H04N 19/105 375/240.12 |
| 2013/0121401 | A1* | 5/2013 | Zheludkov | H04N 19/65 375/240.02 |
| 2014/0072242 | A1* | 3/2014 | Wei | H04N 19/176 382/299 |
| 2015/0110408 | A1* | 4/2015 | Wang | G06T 9/004 382/238 |

* cited by examiner

*Primary Examiner* — Chikaodili E Anyikire
(74) *Attorney, Agent, or Firm* — Chernoff, Vilhauer, McClung & Stenzel, LLP

(57) ABSTRACT

A method and system are disclosed for determining local activity of at least a portion of a coding unit using a sum and difference between a pixel and neighboring pixels being coded. In one embodiment, the method comprises determining a minimum difference between the pixel and neighboring pixels for each pixel in the at least the portion of the coding unit and determining the local activity at least in part according to a sum of the differences between each pixel of the at least a portion of the coding unit and the neighboring pixels, wherein determining a difference between the pixel of the at least a portion of the coding unit and neighboring pixels comprises determining a minimum difference between the pixel and the neighboring pixels.

3 Claims, 19 Drawing Sheets

US 10,742,979 B2

NONLINEAR LOCAL ACTIVITY FOR ADAPTIVE QUANTIZATION

BACKGROUND

1. Field of the Invention

The present invention relates to systems and methods for encoding video data, and in particular to a system for determining a measure of image complexity of sub-picture portions of a video frame and to adaptively controlling the quantization of the encoded video based on such measure.

2. Description of the Related Art

Block-based hybrid video encoding schemes such as high efficiency video coding (HEVC) achieve compression not only by removing redundant information from the bitstream, but also by making adjustments in the quality of the output bitstream. While such quality compromises render HEVC an inherently lossy process, such compromises may be made in a minimally perceptible way. The quality of the output bitstream may be controlled by varying a number of parameters used in the encoding process, including the quantization parameter (QP), which regulates how coarsely the output is quantized. Such quantization impacts how much spatial detail is retained in the coded bitstream. When QP is very small, the quantization step size(s) are small, and almost all that detail is retained. However, as the QP is increased, some of that detail is lost within quantization steps. The result is that bit rate drops, but at a cost of decreased fidelity (increased distortion).

Video encoders may be operated open loop (VBR) or closed loop. When operated open loop, a constant value for QP will result in reasonably constant video quality, but the bit rate may vary dramatically, as the complexity of the video source changes. Such variance places difficult requirements on the output buffers of the encoders providing the bitstream, and the input buffers of the decoders receiving the bitstream. Hence, systems and methods for varying QP depending on the complexity of the images of the uncoded source video have been developed. These systems and method vary the QP based upon an estimation of the picture complexity.

Typically, the pictures of a video sequence have a non-uniform complexity. That is, some areas of a particular picture are typically more complex than other areas of the same picture. Spatial masking, distortion, and artifacts are known to be less humanly perceptible in areas of greater complexity than they are in areas of smooth areas. Accordingly, a maximally-efficient coding scheme would adapt the selected QP used for encoding within a picture according to a non-uniform complexity measure to exploit this characteristic.

At the same time, there is a need to perform encoding at a pace rapid enough to provide the coded video stream in real-time. For example, video encoders that accept live video feeds for processing and broadcast must be capable of encoding the video at the same rate as the video is provided to the encoder.

Accordingly, there is a need for a simple technique to compute a measure of the image complexity of sub-picture areas used in video coding. This need is met by the techniques and systems discussed below, which compute a local activity measure that is simple, yet effective in capturing amount of activity in flat area in at least a portion of a picture

SUMMARY

To address the requirements described above, a method and system for determining local activity of at least a portion of a coding unit. In one embodiment, the method comprises determining a minimum difference between the pixel and neighboring pixels for each pixel in the at least the portion of the coding unit and determining the local activity at least in part according to a sum of the differences between each pixel of the at least a portion of the coding unit and the neighboring pixels. In a further embodiment, the difference between the pixel and neighboring pixels for each pixel in the at least the portion of the coding unit is determined by (a) segmenting the coding unit into a plurality of non-overlapping local areas, (b) identifying a plurality of reference pixels in the local area, (c) for each reference pixel in the local area, determining a minimum difference between the reference pixel and at least two adjacent pixels; and (d) repeating (b) and (c) for each local area of the coding unit. Still another embodiment is evidenced by a method of coding a coding unit of a picture, comprising (a) segmenting the picture into a plurality of non-overlapping local areas, (b) determining a measure of a complexity of the each of the local areas, and (c) coding each local area of the coding unit according to the complexity of each respective local area. In still another embodiment, the measure of a complexity of the each of the local areas is determined by (b1) determining a minimum difference between the intensity of the pixel and the intensity of neighboring pixels for each pixel in a local area, (b2) determining a local activity of the local area at least in part according to a measure of the minimum differences between each pixel and the neighboring pixel, (b3) determining the complexity of each local area at least in part according to the local activity of the local area, (b4) repeating steps (b1)-(b3) for each of the local areas in the coding unit. Still another embodiment is evidenced by an apparatus having a processor and a memory communicatively coupled thereto, storing instructions for performing the foregoing operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

HEVC SUMMARY

Audio-Visual Information Transception and Storage

Figure 1:
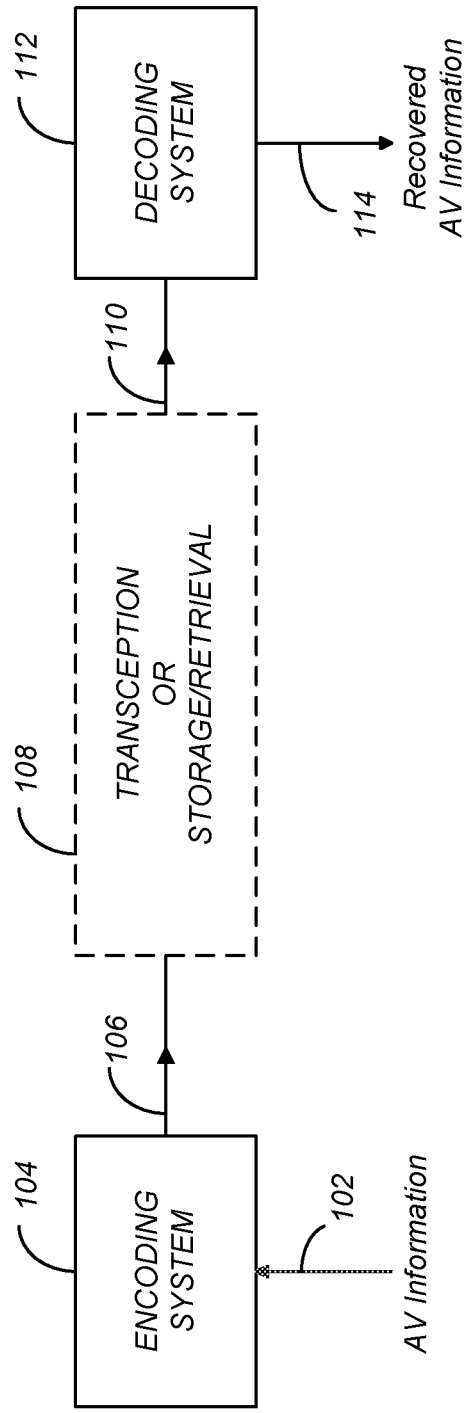
FIG. 1 is a diagram depicting an exemplary embodiment of a video coding-decoding system that can be used for transmission and/or storage and retrieval of audio and/or video information.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 (also referred to hereinafter as uncoded video) and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2A:
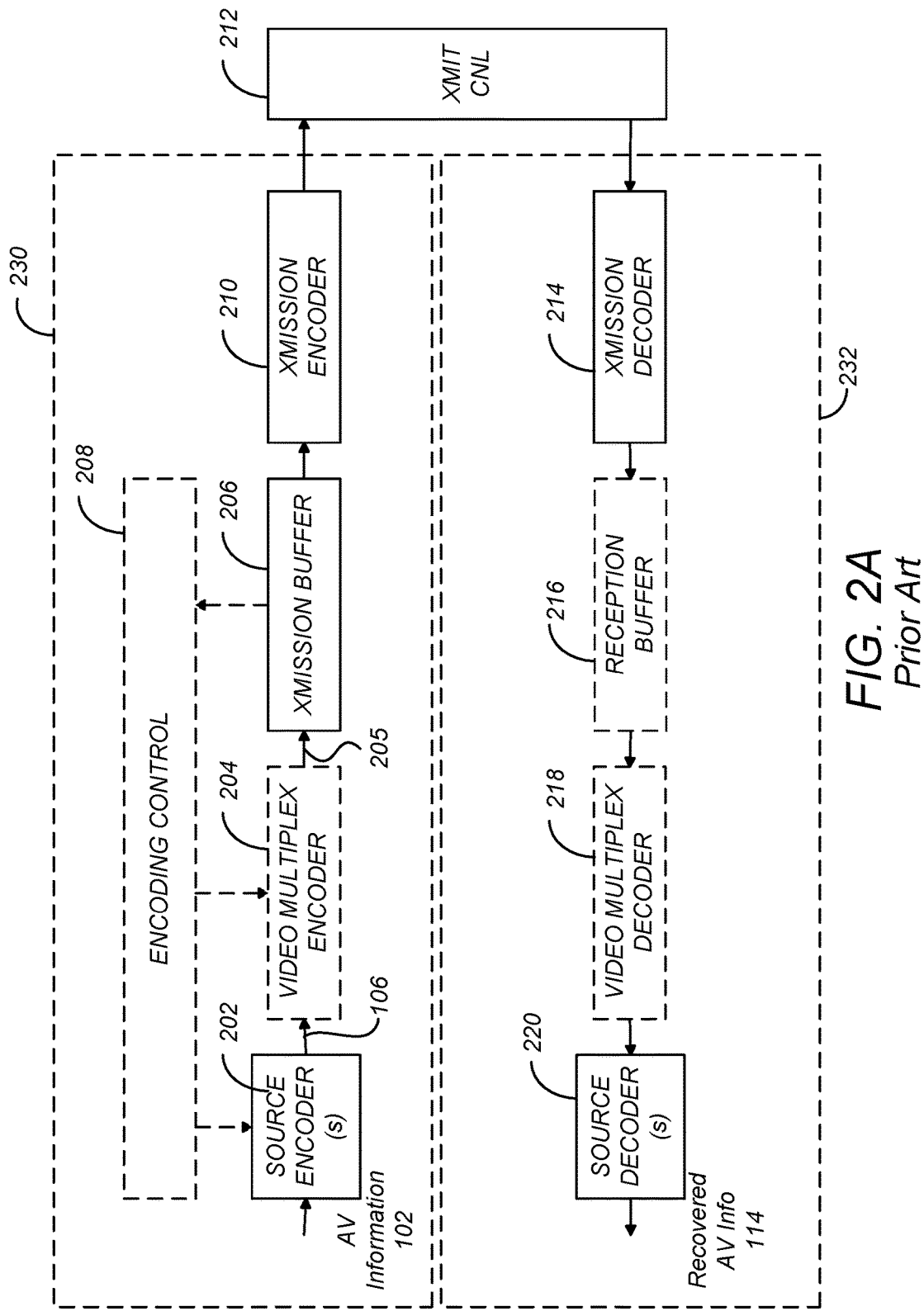
FIG. 2A is a diagram of one embodiment of a codec system in which the encoded AV information is transmitted to and received at another location.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 232.

The transmission segment 230 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 102 according to certain performance parameters that affect the instantaneous bit rate, the signals from each of the source encoders 202 (each having a temporally varying instantaneous bit rate)

can be combined together in an optimal way to minimize the instantaneous bit rate of the multiplexed stream 205.

As described above, the source encoder 202 and the video multiplex coder 204 may optionally be controlled by a encoding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 210 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission encoder 210 using a decoding scheme complementary to the coding scheme used in the transmission decoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex encoder 204. Finally, the video signal of interest is decoded by source decoder 220 (hereinafter also referred to as a target decoding device) using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL units are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The reception segment client 232 decodes the received and reconstructed data stream and reproduces the video images on a display device and the audio data by a loud speaker.

Figure 2B:
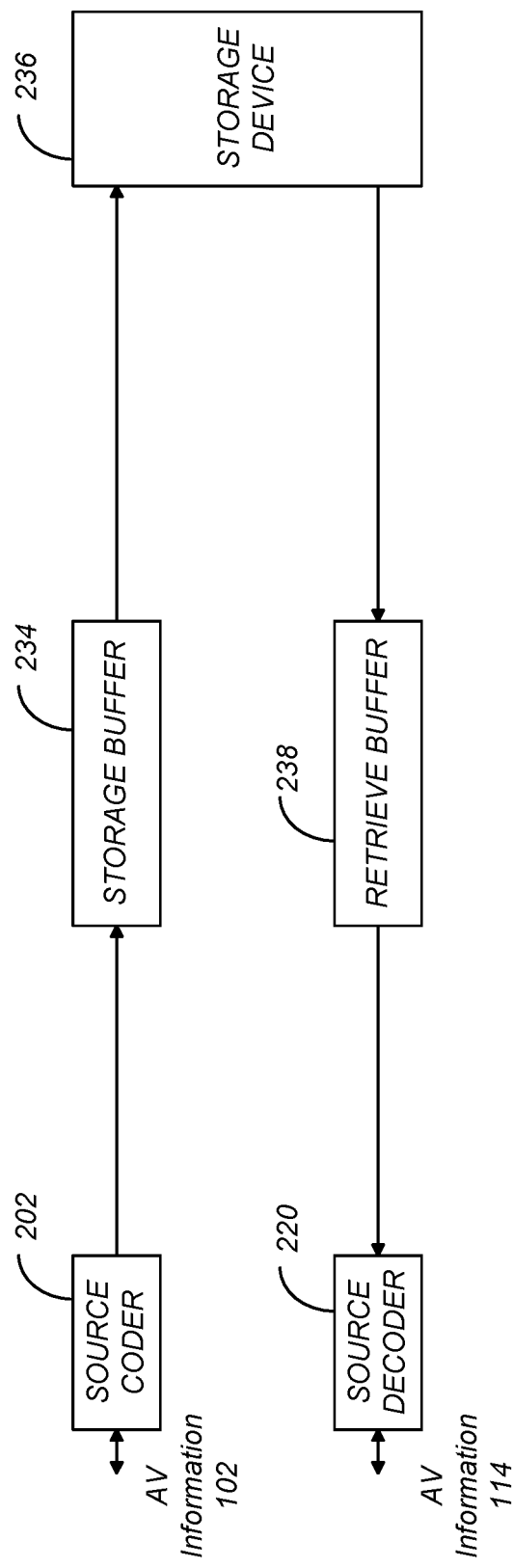
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
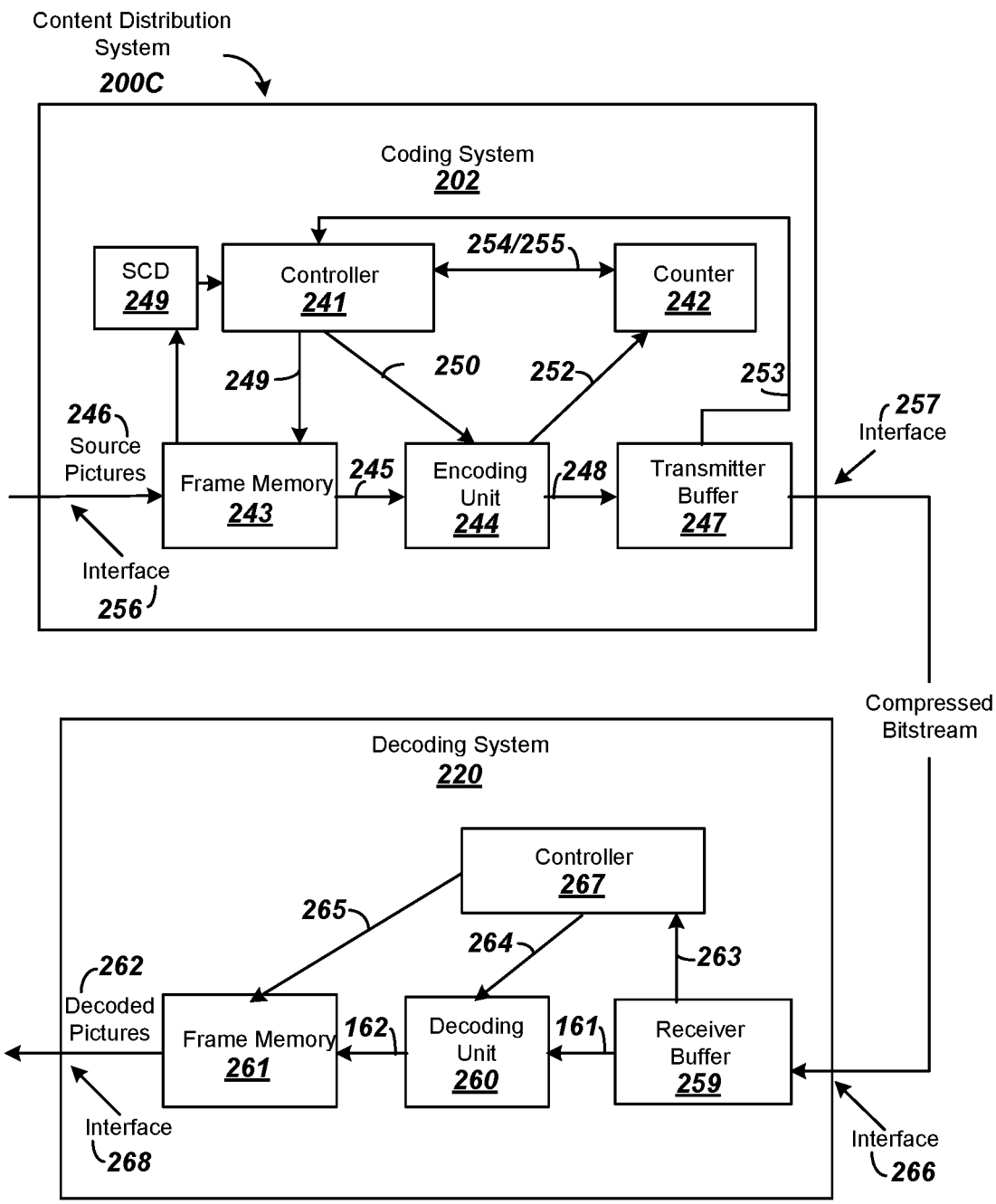
FIG. 2C is another diagram depicting an exemplary content distribution system comprising a coding system or encoder and a decoding system or decoder that can be used to transmit and receive HEVC data.

FIG. 2C is another diagram depicting an exemplary content distribution system 200C comprising a coding system or encoder 202 and a decoding system or decoder 220 that can be used to transmit and receive HEVC data.

In some embodiments, the coding system 202 can comprise an input interface 256, a scene change detector 249, a controller 241 a counter 242 a frame memory 243, an encoding unit 244, a transmitter buffer 247 and an output interface 257.

The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 247 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures 246 utilizing the controller 241. The frame memory 243 can have a first area that can be used for storing the incoming frames from the source pictures 246 and a second area that can be used for reading out the frames 245 and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 244 to start an encoding operation, such as preparing the Coding Units of a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 247.

The encoded video signal 248, including the generated video compression data, can be stored in the transmitter buffer 247. The information amount counter 242 can be incremented to indicate the total amount of data in the transmitter buffer 247. As data is retrieved and removed from the buffer, the counter 242 can be decremented to reflect the amount of data in the transmitter buffer 247. The occupied area information signal 253 can be transmitted to the counter 242 to indicate whether data from the encoding unit 244 has been added or removed from the transmitter buffer 247 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 247.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 247.

In some embodiments, the decoding system 220 can comprise an input interface 266, a receiver buffer 259, a controller 267, a frame memory 261, a decoding unit 260 and an output interface 268. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 267. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 264 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 162 into the frame memory 261. The frame memory 261 can have a first area into which the decoded video signal is written, and a second area used for reading out decoded pictures 262 to the output interface 268.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below.

Figure 3:
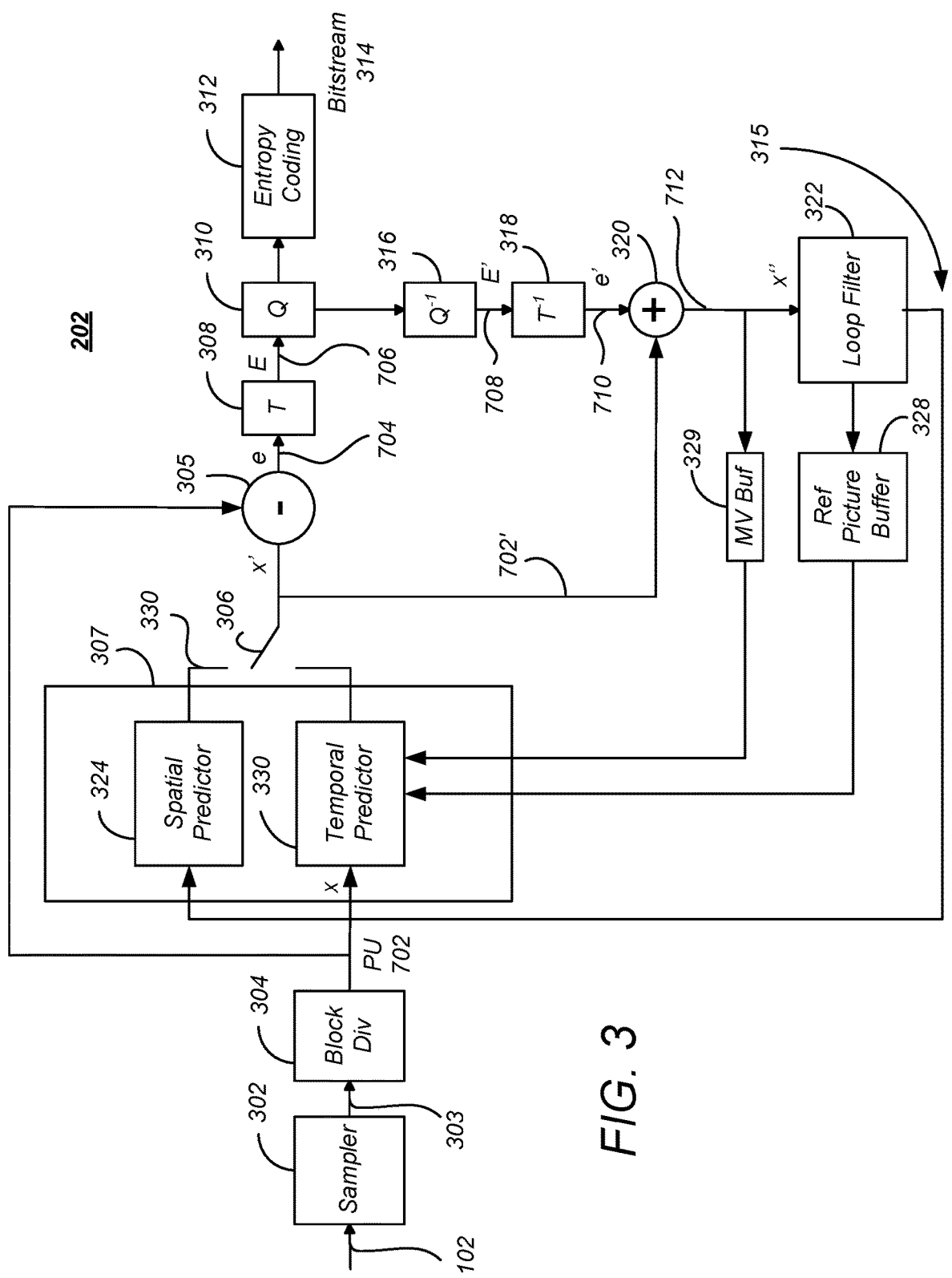
FIG. 3 is a block diagram illustrating one embodiment of the source encoder.

FIG. 3 is a block diagram illustrating one embodiment of the source encoder 202. The source encoder 202 accepts AV information 102 and uses sampler 302 to sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces a digitized (and as yet, uncompressed) picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
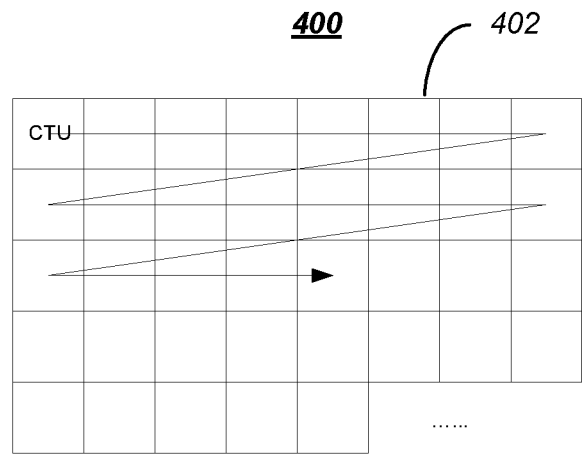
FIG. 4 is a diagram depicting a picture of audio visual information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units (s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
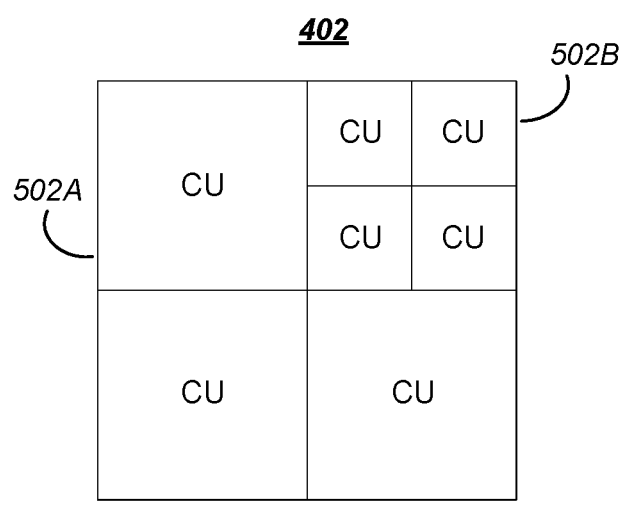
FIG. 5 is a diagram showing an exemplary partition of a coding tree block into coding units.

FIG. 5 is a diagram showing an exemplary partition of a CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
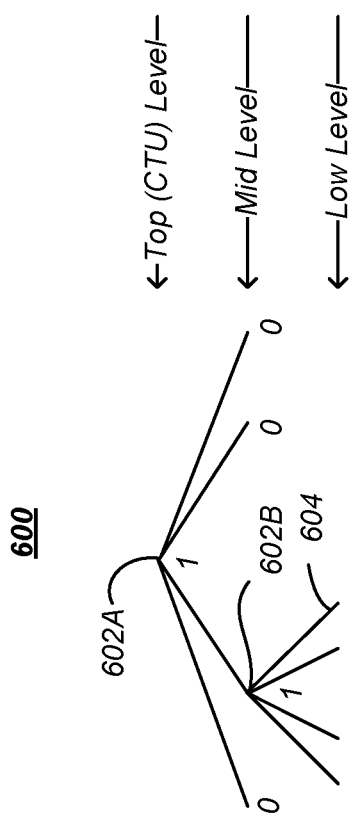
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The source encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and transform units (TUs), both of which have a maximum size equal to the size of the corresponding CU 502.

Figure 7:
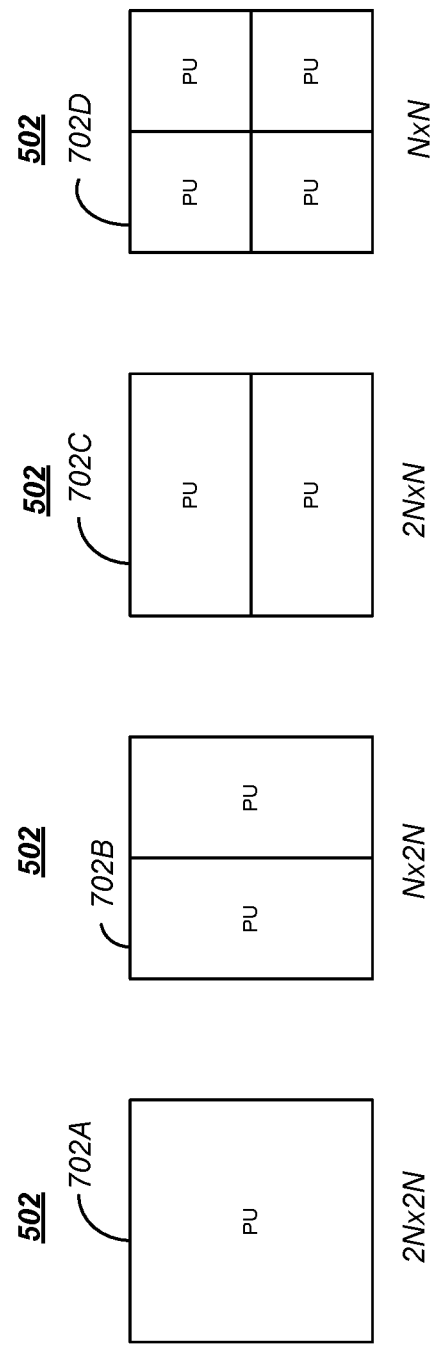
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D), as shown in FIG. 7, as well as certain other asymmetric motion partitions (AMP) defined in the HEVC specification.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
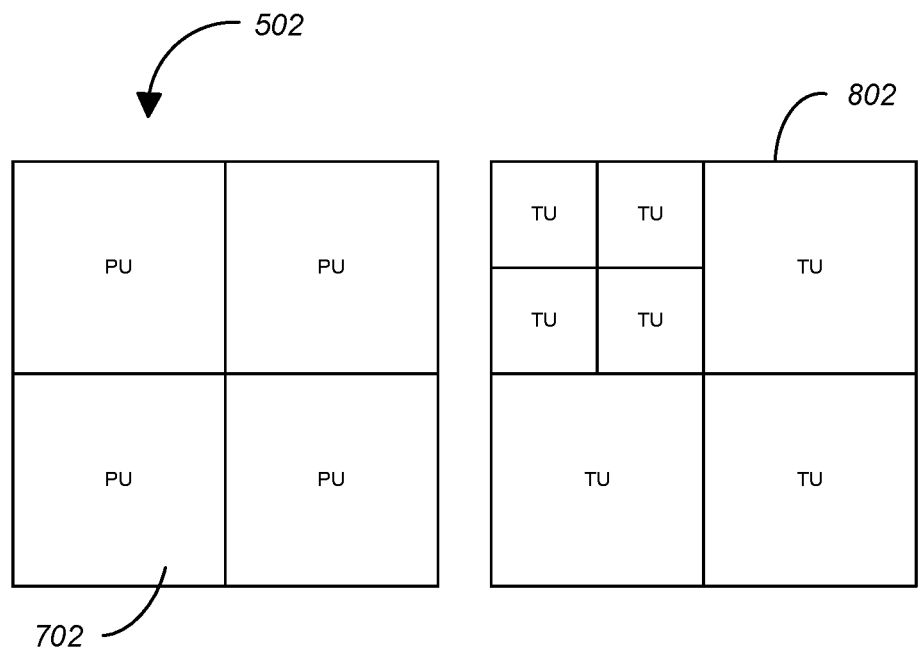
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a transform such as the DCT (Discrete Cosine Transform) or the DST (discrete sine transform). The size and location of each block transform TU 802 within a CU 502 is described by a "residual" quadtree (RQT) further illustrated below.

Figure 9:
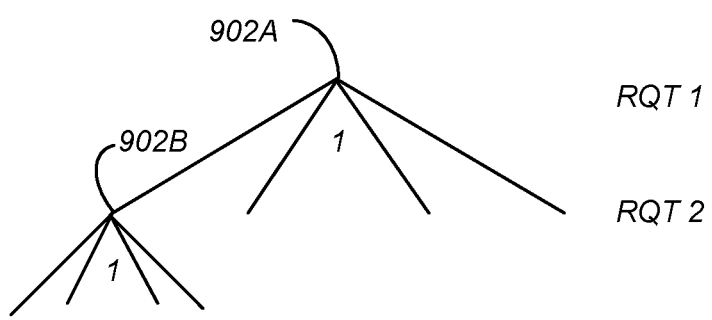
FIG. 9 is a diagram showing a residual quad tree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
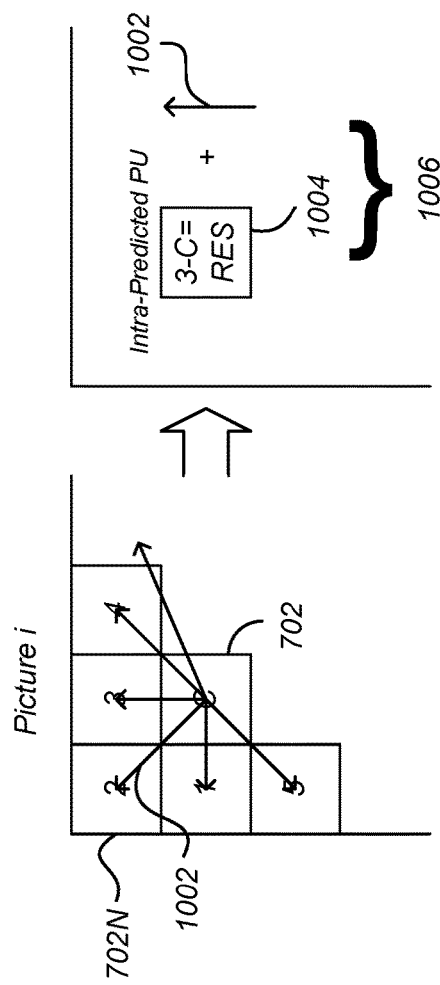
FIG. 10 is a diagram illustrating spatial prediction.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3, 4 or 5 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 ($e$) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
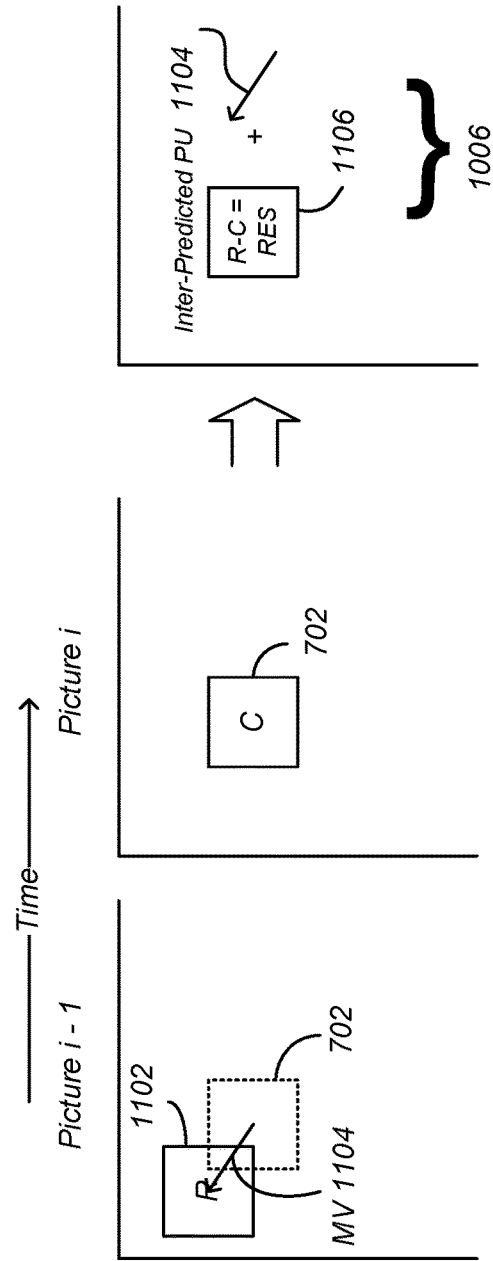
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that defines the displacement between the current PU 702 in current frame (picture i) and the reference area 1102 identified by a reference index (refIdx) in the reference frame (picture i−1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1006. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
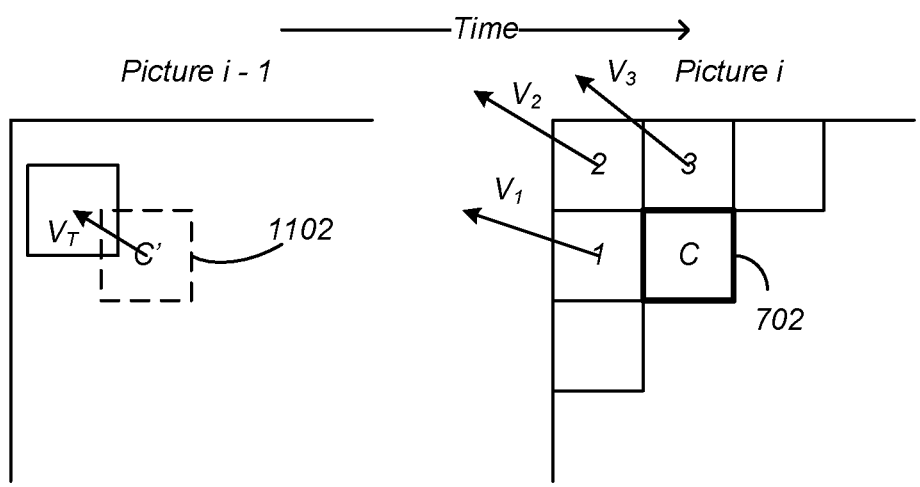
FIG. 12 is a diagram illustrating the use of motion vector predictors.

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e.g. block of picture i−1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

The intra-predicted residuals 1004 and the inter-predicted residuals 1106 obtained from the spatial (intra) or temporal (inter) prediction process are then transformed by transform module 308 (depicted in FIG. 3) into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 314 as a part of the useful data coding the images of the AV information. Coding syntax elements may also be coded using spatial dependencies between syntax elements to increase the coding efficiency. HEVC offers entropy coding such as context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream, typically a picture or slice header.

The filtered images, also known as reconstructed images, are then stored as reference images from reference image buffer 328 in order to allow the subsequent "Inter" predictions taking place during the compression of the subsequent images of the current video sequence.

Picture Level QP Rate Control

For quantization, HEVC uses essentially the same uniform-reconstruction quantization (URQ) scheme controlled by a quantization parameter (QP) as in H.264/MPEG-4 AVC. The range of the QP values is defined from 0 to 51, and an increase by 6 doubles the quantization step size, such that the mapping of QP values to step sizes is approximately logarithmic. Quantization scaling matrices are also supported.

To reduce the memory needed to store frequency-specific scaling values, only quantization matrices of sizes 4×4 and 8×8 are used. For the larger transformations of 16×16 and 32×32 sizes, an 8×8 scaling matrix is sent and is applied by sharing values within 2×2 and 4×4 coefficient groups in frequency sub-spaces—except for values at DC positions, for which distinct values are sent and applied.

It is also advantageous to adapt QP estimates on a sub-picture basis. This can exploit the non-uniform nature of HEVC coding. Spatial masking and distortion is less noticeable in busy (higher complexity) areas than in non-busy (smooth or less complex) areas. Accordingly, a higher QP parameter may be assigned to a busy area of the picture (thus requiring fewer bits to code) and a lower QP parameter (resulting in encoding using a greater number of bits) may be used in smooth areas.

Local Activity

In the HEVC standard, QP can be changed at a CU that is larger than a predetermined size (e.g. 8×8, 16×16, etc.) that is configurable by the user. To assist in determining an appropriate QP for a particular portion of the CU, it is useful to derive a measurement of the complexity or "busyness" of the portion of the CU. That measure of the complexity may be referred to as the "local activity" of the corresponding portion of the CU.

If the encoder is to encode video in real time, it is important that the encoder employ a measure of local activity that can be accomplished quickly while using a minimum amount of memory, so that computational costs are reduced. Simple measures of local activity such as the variance or summation of horizontal difference and vertical differences are commonly used in such real-time encoders. Equations (1) and (2) are equations which summarize such measures, with Equation (1) representing a variance based measure, and Equation (2) representing a pixel difference based measure:

$$\Sigma(p(x,y)-\text{mean})^2 \quad (1)$$

$$\Sigma(|p(x,y)-p(x-1,y)|+|p(x,y)-p(x,y-1)|) \quad (2)$$

Where p(x,y) is an intensity of the pixel at location (x,y), Σ is a summation operation over all pixels in a local area, and mean is an average intensity of all pixels in a local area.

These simple local activity measures have issues in some situations where the measurements don't correlate well with actual activity of the corresponding area; for example, edges in middle of flat area (typically encountered with text).

Figure 13A:
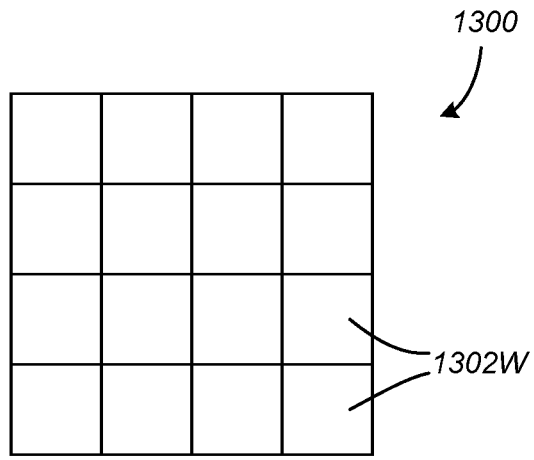
FIGS. 13A-13C are diagrams showing three examples of local areas having a plurality of pixels.
Figure 13B:
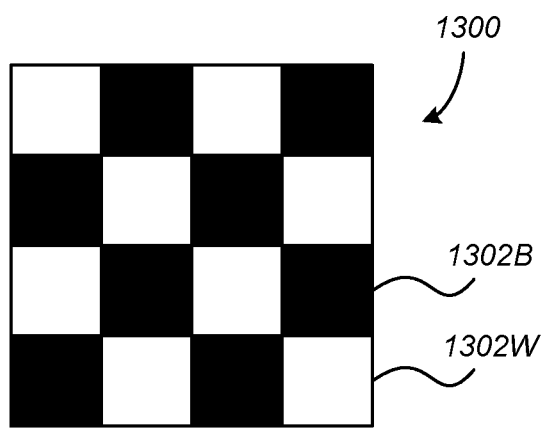
Figure 13C:
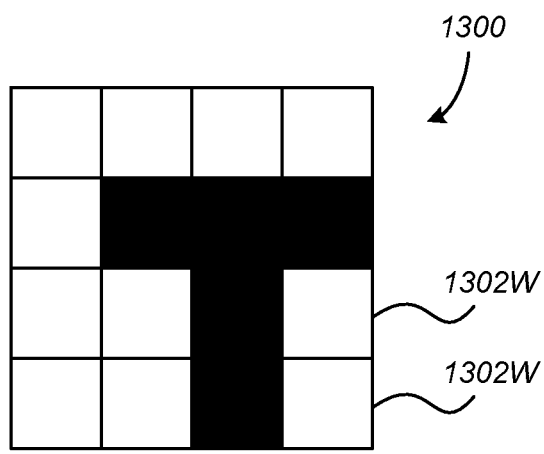

FIGS. 13A-13C are diagrams shows three examples of local areas 1300, having a plurality of pixels 1302. In the illustrated embodiment, the local areas 1300 consist of 16 pixels 1302 (4×4) and each has a pixel intensity value of zero (denoted by white pixels 1302W) or 255 (denoted by black pixels 1302B).

FIG. 13A depicts a flat local area 1300 that is highly sensitive to QP-related artifacts. The corresponding local activity measurement of this flat area, computed according to Equation (1) (variance-based) is zero, as is the local activity measurement of the flat area computed according to Equation (2) (pixel-based).

FIG. 13B depicts a "busy" local area 1300 that is relatively insensitive to QP-related artifacts. Using Equation (1), the corresponding variance-based local activity of this busy area is 2040. Similarly, using Equation (2), the corresponding pixel-based local activity is 8160.

FIG. 13C depicts a local area 1300 having text that is highly sensitive to QP-related artifacts. Using Equation (1), the corresponding variance-based local activity of this busy area is 1753.125. Similarly, using Equation (2), the corresponding pixel-based local activity is 2250.

As can be seen in FIGS. 13A-13C, the measure of local activity of a local area is higher for text (e.g. FIG. 13C) than it is for a flat area, indicating that the measure of local activity is useful to determine that a local area having text is be more complex than a flat local area. If these relationships were applied to adaptive quantization processes, a higher QP value would be used in text area shown in FIG. 13C and in busy area shown in FIG. 13B and a lower QP value would be used in the flat area illustrated in FIG. 13A. This outcome results in annoying visual artifacts due to high quantization noise in text area. Such visual artifacts are very sensitive to human observation.

Non-Linear Local Activity for Adaptive Quantization

A nonlinear local activity measure that is simple, yet effective in capturing an amount of activity in a flat area is discussed below. This local activity measure helps reduce coding artifacts when using adaptive quantization processes, and is suitable for use in real-time video encoders.

As described further below, for each pixel within a local area, the differences between the pixel and its selected neighboring pixels are computed and the minimum difference among all the pixel differences is determined. The minimum differences of all the pixels within the local area are then accumulated, and the sum is used as local activity measure for the local area. The "minimum" operation is used since it considers the processing pixel to be in flat area when it is similar to one of its neighbors.

Figure 14:
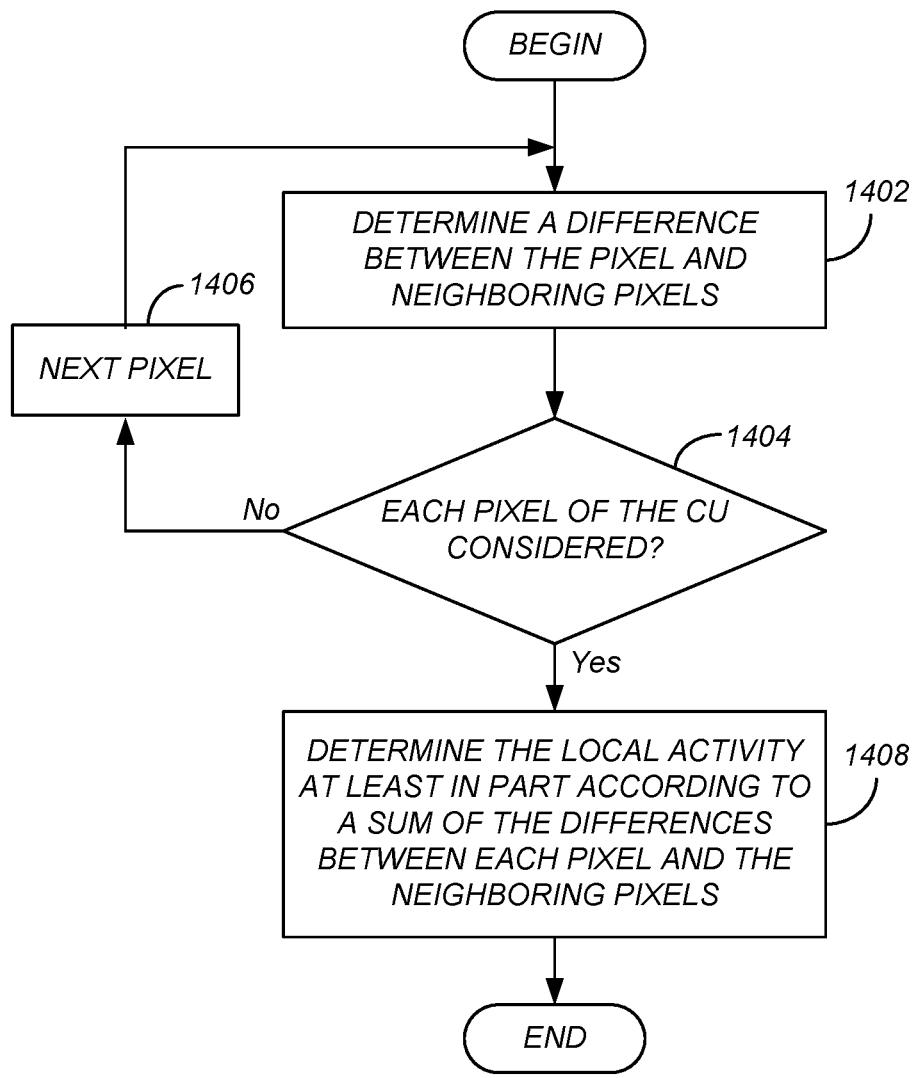
FIG. 14 is a diagram presenting exemplary operations that can be used to determine the local activity of at least a portion of a coding unit.

FIG. 14 is a diagram presenting exemplary operations that can be used to determine the local activity of at least a portion of a coding unit 502. In block 1402, a difference is determined between a pixel in the coding unit 502 and the pixels neighboring the pixel in the coding unit. In one embodiment, the difference comprises a difference in pixel intensity, for example, luminance. As shown in blocks 1404 and 1406, this process is repeated for each pixel in the coding unit 502. Finally, in block 1408, the local activity of the at least a portion of the coding unit 502 is determined at least in part according to a sum of the determined differences between each pixel and the neighboring pixels.

In one embodiment, the operations of block 1402 comprise determining a minimum difference between the pixel and neighboring pixel. For example, the difference in intensity between the pixel and the first neighboring pixel is 50 and the difference in intensity between the pixel and a second neighboring pixel is 30, the operation of block 1402 produces the minimum value of 50 and 30 (e.g. min(50,30)) which is 30. In one embodiment, the neighboring pixels are those pixels which are adjacent to the pixel of interest, but in other embodiments, neighboring pixels may include pixels that are separated from the pixel of interest by one or more pixels.

Figure 15:
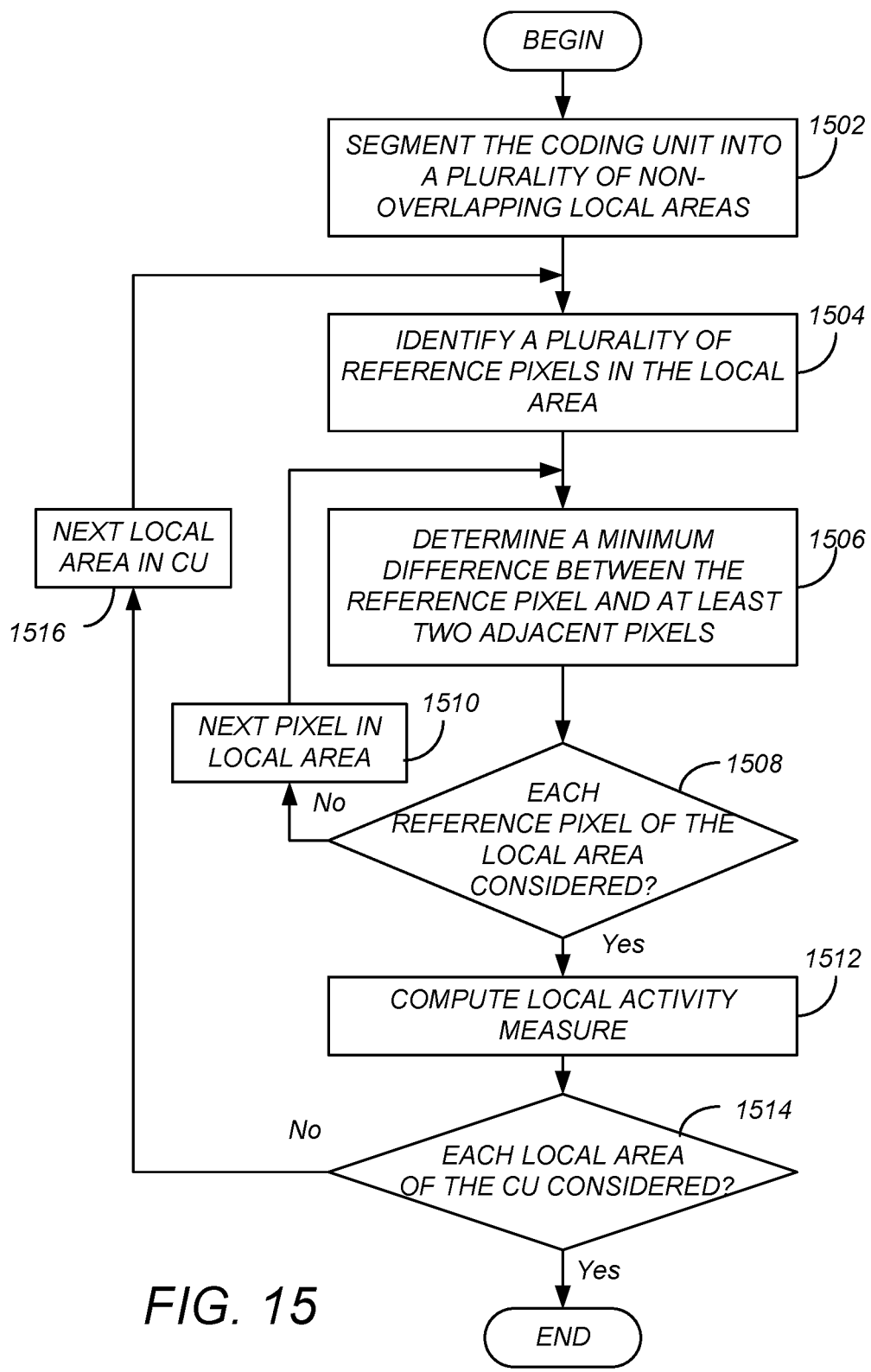
FIG. 15 is a diagram presenting further exemplary operations that can be used to determine the local activity of at least a portion of a coding unit.

FIG. 15 is a diagram presenting other exemplary operations that can be used to determine the local activity of at least a portion of a coding unit 502. FIG. 15 is discussed with reference to FIG. 16, which is a diagram illustrating how the CU 502 may be separated into local areas 1602A-1602D (hereinafter alternatively referred to as local area(s) 1602) for further processing.

Turning to FIG. 15, the coding unit 502 is segmented into a plurality of local areas 1602. In the illustrated embodiment, the local areas 1602 are non-overlapping and directly adjacent one another, and are indicated by the bold lines. In block 1504, a plurality of reference pixels are identified in one of the local areas produced by block 1502.

Figure 16:
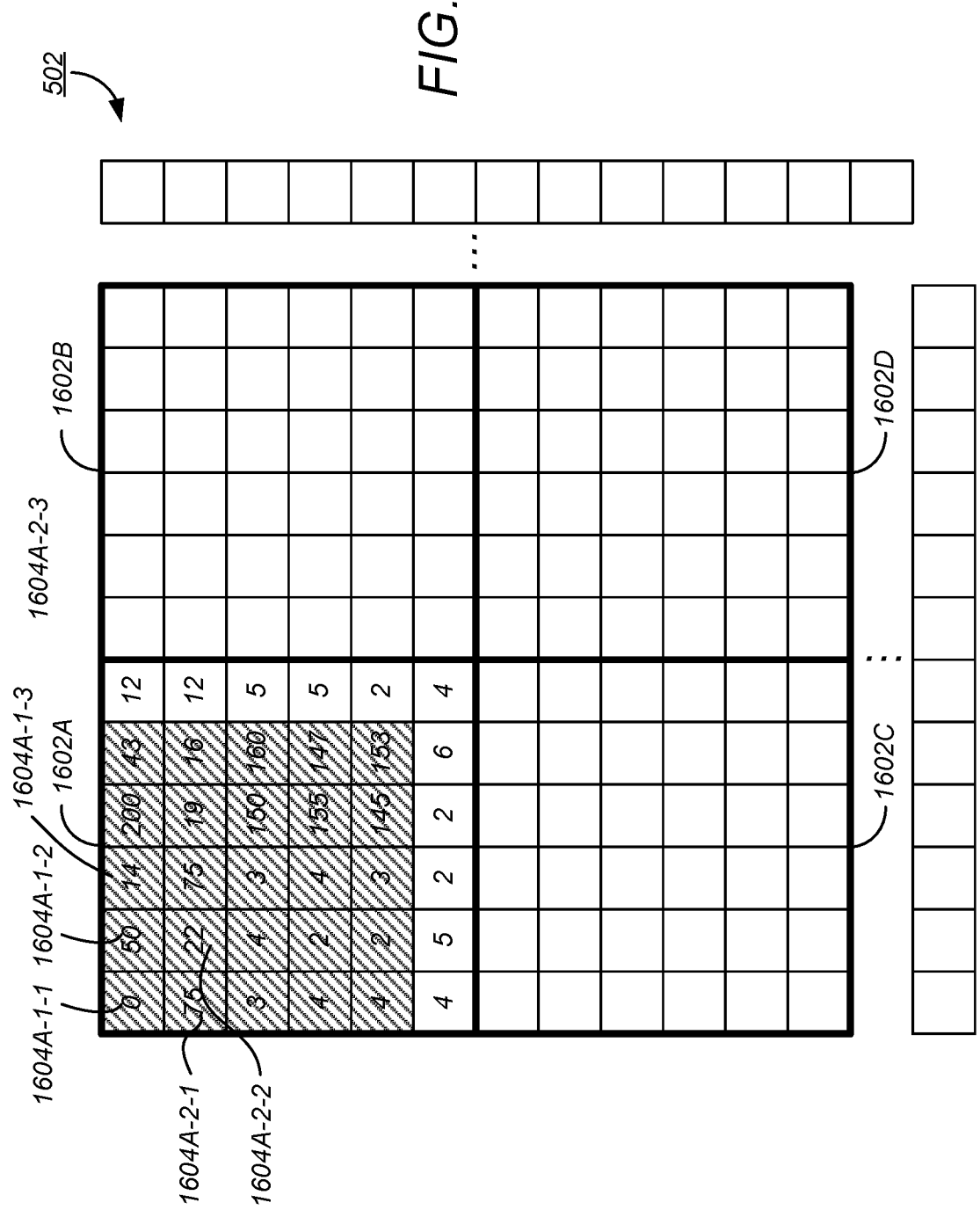
FIG. 16 is a diagram illustrating one embodiment of how reference pixels may be identified.

FIG. 16 is a diagram illustrating one embodiment of how the reference pixels may be identified. In one embodiment, the reference pixels are identified such that when the difference between each reference pixel and neighboring pixels are determined, those neighboring pixels do not extend outside of the local area 1602. This notion is discussed further below. An exemplary selection of reference pixels is shown in the shaded areas of FIG. 16. Pixels are labeled according to the local area 1602 in which they reside (e.g. the reference number for all of the pixels within local area 1602A begin with 1602A) and end with a two number value x-y, wherein x denotes the pixel's row and y denotes the pixel's column.

In the embodiment illustrated in FIG. 16, the local areas 1602 are non-overlapping and are square and of the same pixel dimension (e.g. all of the local areas 1602 are 6×6 pixels), but this need not be the case. In other embodiments, the local areas 1602 may be of different dimensions, and need not be square (e.g. local area 1602A may be 6×6, but local areas 1602B may instead include two local areas 1602, each of dimension 3×6 or four local areas 1602, each of dimension 3×3). Local areas 1602 may also be overlapping, as discussed further below.

Next, for each reference pixel in the local area a minimum difference in a pixel parameter is determined between the reference pixel and at least two adjacent pixels, as shown in block 1506. FIG. 16 illustrates a first reference pixel 1604A-1-1 as the upper and leftmost pixel of the local area 1602A. A minimum difference in the intensity is determined between reference pixel 1604A-1-1 and at least two of its adjacent pixels (e.g. pixel 1604A-2-1 and pixel 1604A-1-2). For example, considering first reference pixel 1604A-1-1 having an intensity value of zero, and adjacent pixel 1604A-1-2 having an intensity value of 50 and another adjacent pixel 1604A-2-1 having an intensity value of 75, the foregoing operation would identify the minimum difference in intensity as 50.

Returning to FIG. 15, block 1508 determines whether each pixel of the local area 1602A of the CU 502 has been considered. If not, processing is routed to blocks 1510 to and 1506 to determine the minimum distance between the next reference pixel. In the above example, the operation of block 1508 tests false, since all of the reference pixels within local area 1602A have not been considered. Hence, processing is routed to blocks 1506 and 1510. Presuming the next reference pixel is pixel 1604A-1-2 (the next reference pixel may be the next pixel to the right, or pixel 1604A-1-2, or it may be the next pixel below the previously considered pixel, or pixel 1604A-2-1), the minimum difference between reference pixel 1604A-1-1 and adjacent pixels 1604A-1-3 and 1604A-2-2 (which have not been already considered) is min(|50−14|, |50−22|)=min (36,28)=28.

The foregoing steps are completed for each of the reference pixels in the local area 1602A. When each of the reference pixels in the local area 1602A have been considered, block 1508 tests true, and processing is routed to block 1512, where the local activity measure of the local area 1602 is computed according to a sum of the minimum differences between each reference pixel and neighboring pixels.

In one embodiment, this is accomplished as described in Equation (3):

$$\sum_{x=1}^{N-1}\sum_{y=1}^{N-1} \min(|p(x,y)-p(x+1,y)|,|p(x,y)-p(x,y+1)|) \quad (3)$$

wherein x denotes the row and y denotes the column of each pixel p 1604 in the local area 1602, p(x,y) denotes the pixel intensity at location (x, y), and the min(operand 1, operand 2) operation denotes the minimum of operand 1 and operand 2.

Figure 17:
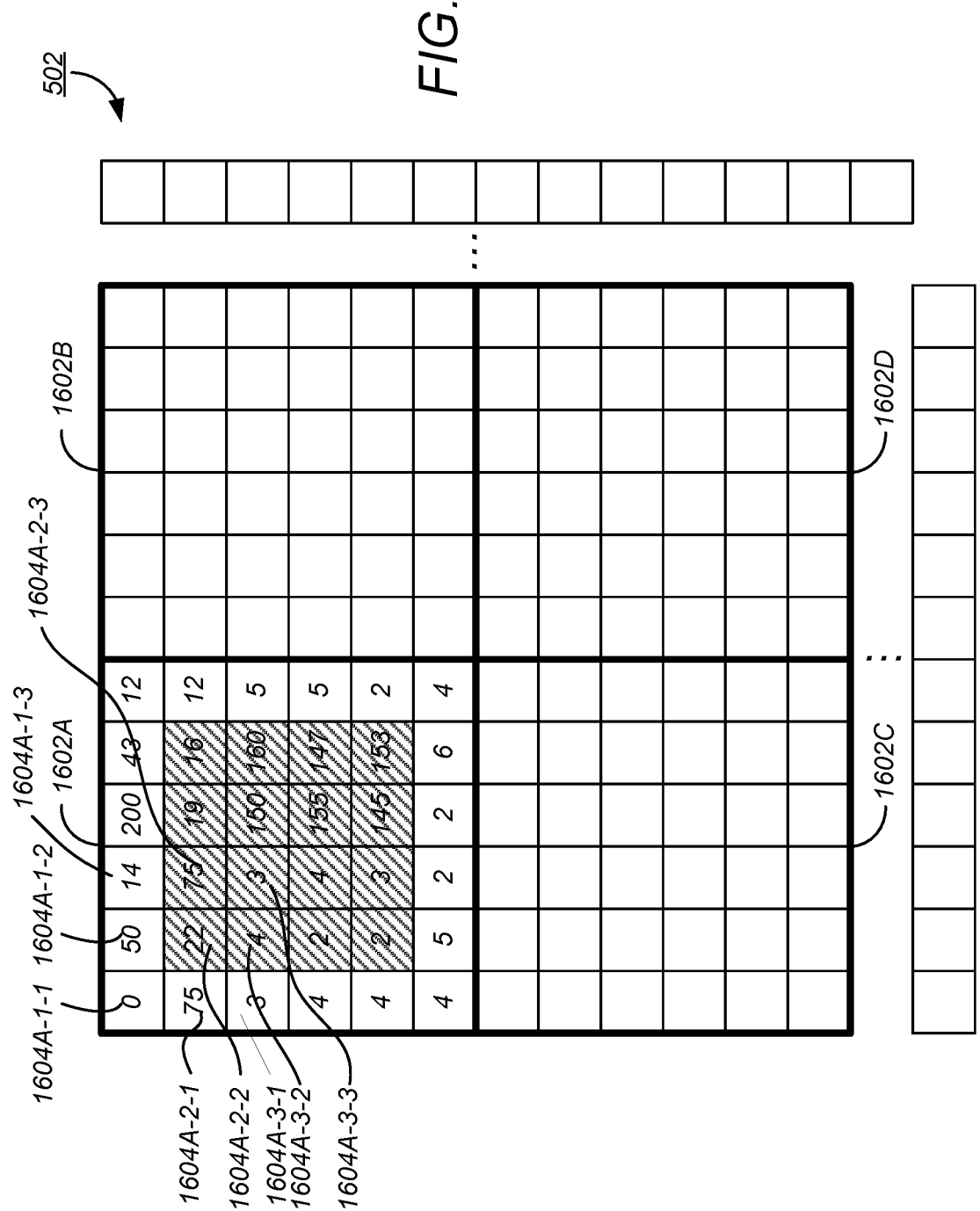
FIG. 17 is a diagram illustrating another embodiment of how reference pixels may be identified.

FIG. 17 is a diagram illustrating another embodiment of how the reference pixels may be identified. In this embodiment, the reference pixels are also identified so that when the difference between each reference pixel and neighboring pixels are determined, those neighboring pixels are not disposed outside of the local area. However, in this embodiment, the reference pixels are defined so that the neighboring pixels include pixels to the left, right, above, and below the reference pixel. Accordingly, the reference pixels are represented by the innermost N−2 columns of pixels and the innermost N−2 rows of pixels in the local area 1602, as shown in FIG. 17.

In this embodiment, the operation performed in block 1506 includes determining a minimum difference between the reference pixel and at least four adjacent pixels, namely, the pixels to the left, right, above and below the reference pixel. For example, considering reference pixel 1604A-2-2, the minimum difference between this reference pixel and pixels 1604A-2-1, 1604A-2-3, 1604A-1-2, and 1604A-2-2 is the min(|75−22|,|75−22||50−22|,|4−22|)=min(53,53,28,18)=18.

In this embodiment, the computation associated block 1512, where the local activity measure of the local area 1602 is computed according to a sum of the minimum differences between each reference pixel and neighboring pixels is accomplished as described in Equation (4):

$$\sum_{x=2}^{N-1}\sum_{y=2}^{N-1} \min\begin{pmatrix}|p(x,y)-p(x-1,y)|, |p(x,y)-p(x,y-1)|,\\|p(x,y)-p(x+1,y)|, |p(x,y)-p(x,y+1)|\end{pmatrix} \quad (4)$$

wherein x denotes the row and y denotes the column of each pixel p 1604 in the local area 1602, p(x,y) denotes the pixel intensity at location (x, y), and the min(operand 1, operand 2) operation denotes the minimum of operand 1 and operand 2.

In the foregoing embodiment, only the pixels adjacent to and to the left, right, top and bottom of the reference pixel were considered in determining local activity. However, other neighboring pixels, including pixels that are not adjacent may also be considered, and appropriately weighted as well. For example, for reference pixel 1604A-2-2, the neighboring pixels may also include pixels 1604A-1-1, 1604A-1-3, 1604A-3-3 and 1604A-3-1.

Figure 18:
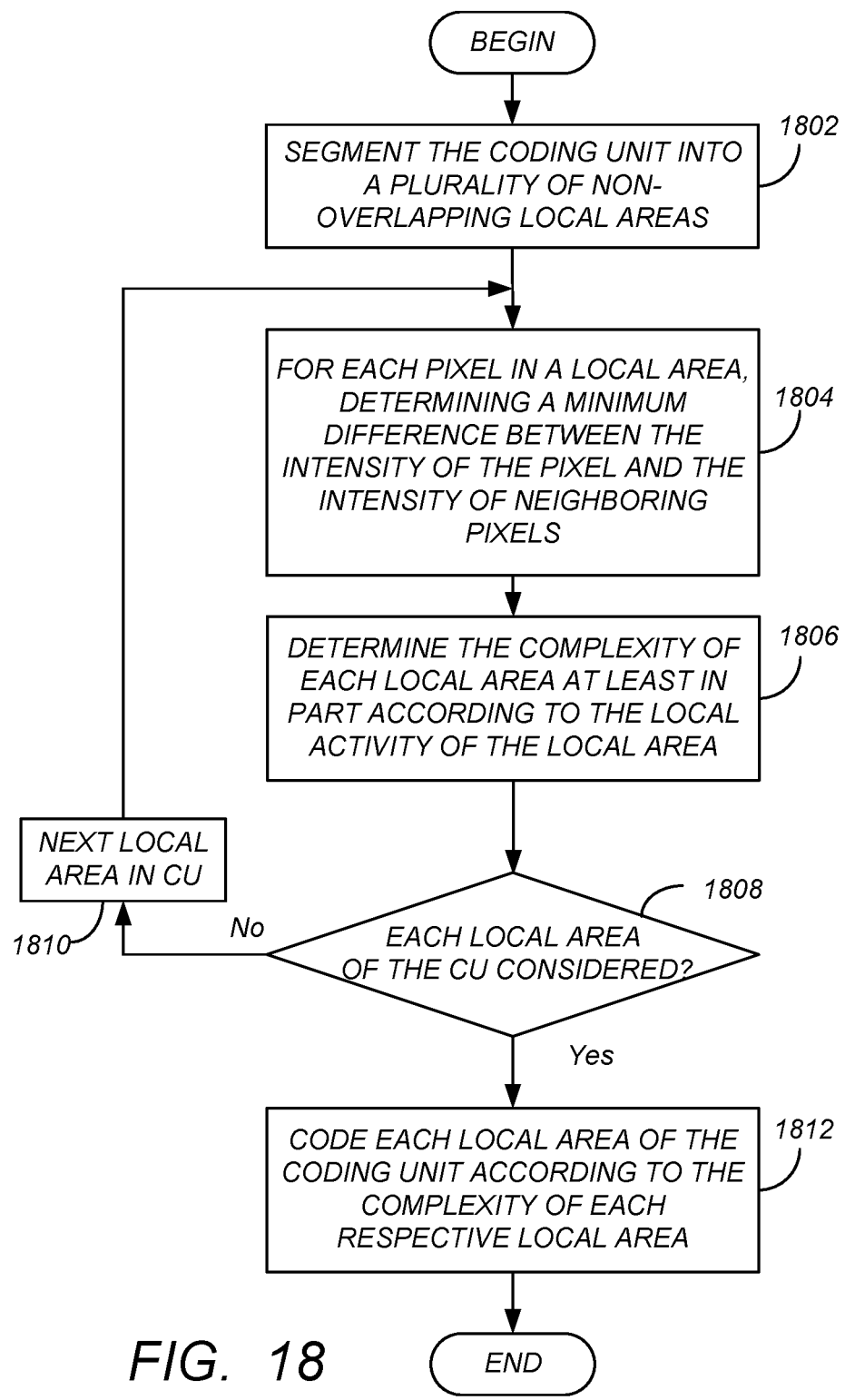
FIG. 18 is a diagram depicting further exemplary operations that can be used to code a coding unit of a picture.

FIG. 18 is a diagram depicting further exemplary operations that can be used to code a coding unit 502 of a picture. In block 1802, the coding unit 502 is segmented into a plurality of non-overlapping local areas 1602. In block 1804, for each pixel in a local area, a minimum difference between the intensity of the pixel 1604 and the intensity of its neighboring pixels is determined. This can be determined using any of the techniques described above.

In block 1806, the complexity of each local area 1602 within the coding unit 502 of the picture is determined at least in part according to the local activity of the local areas 1602. For example, the determined complexity may be the computed local activity itself, or a function thereof.

Block 1808 determines if each local area 1602 of the coding unit 502 has been considered. If not, processing is routed to block 1810 which iterates to the next local area 1602 in the coding unit 502, and routes processing to blocks 1804 and 1806 to repeat the process for the next local area 1602 under consideration. Finally, in block 1812, each local area 1602 the coding unit 502 is coded according to the determined complexity of each respective local area 1602.

While the coding unit 512 coding operations are illustrated outside of the processing loop formed by blocks 1804-1810, other embodiments are possible wherein the coding of each local area occurs within such processing loop.

In the embodiments illustrated in FIGS. 16 and 17, the reference pixels were identified such that when the difference between each reference pixel and neighboring pixels are determined, those neighboring pixels do not extend outside of the local area 1602. However, that need not be the case. Instead the reference pixels identified in block 1504 may include all of the pixels 1604 of the local area 1602, and the neighboring pixels include pixels in other local areas 1602. Alternatively, the local areas 1602 may be defined to be overlapping with other local areas 1602 so that the neighboring pixels include only pixels in the local area, but a particular pixel may be included in two or more overlapping areas.

Figure 19:
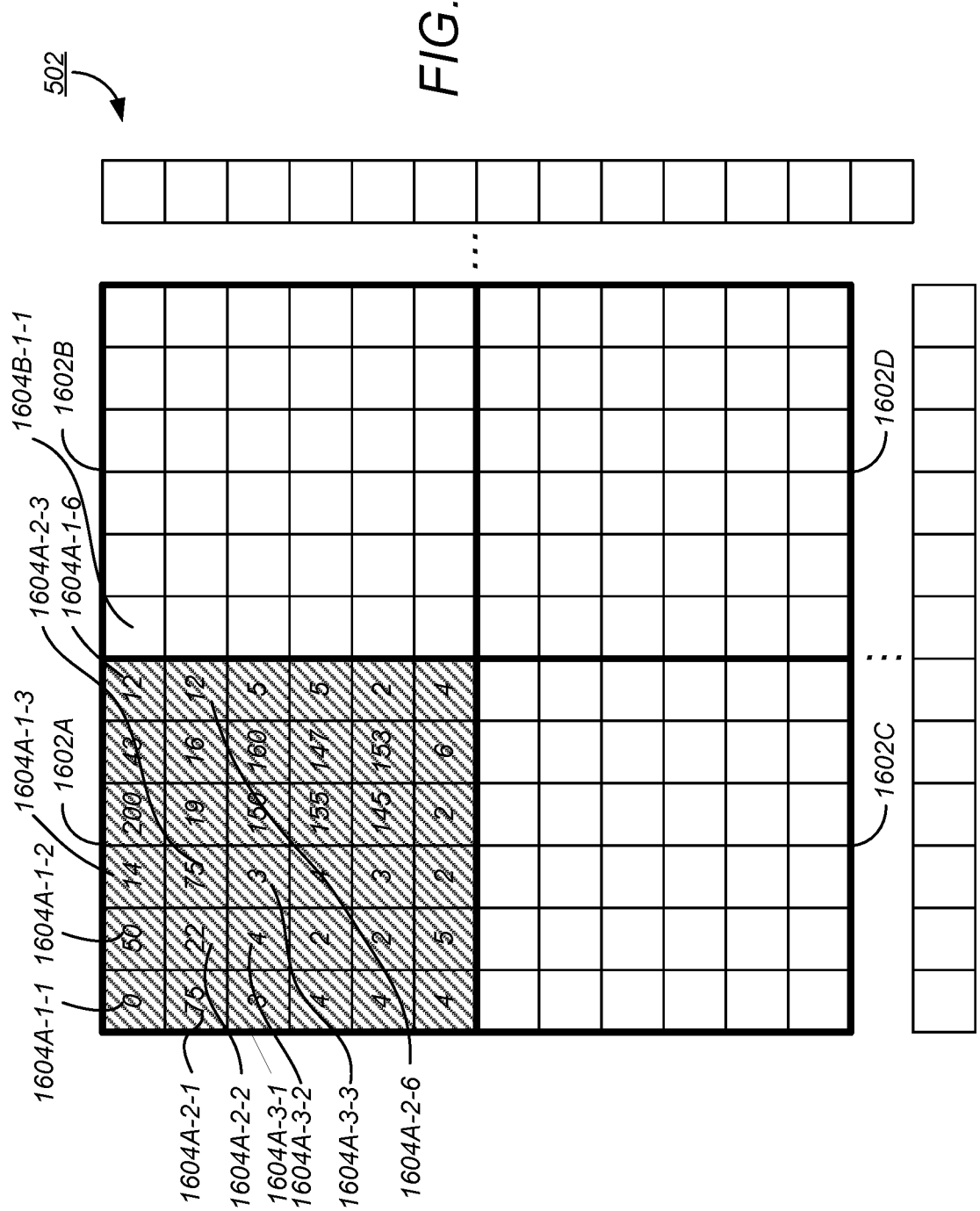
FIG. 19 is a diagram illustrating another embodiment of how the reference pixels may be identified.

FIG. 19 is a diagram illustrating another embodiment of how the reference pixels may be identified. In this embodiment, the reference pixels (indicated by shading) include all of the pixels in the local area 1602, and when computing local activity, a minimum difference in a pixel parameter is determined between the reference pixel and at least two adjacent pixels that may be outside of the local area 1602. For example, pixel 1604A-1-4 may be considered to be a reference pixel, and the minimum difference between pixel 1604A-1-6 and adjacent pixels 1604B-1-1 and 1604A-2-6 may be included within the sum described in Equation (3). Thus, Equation (3) becomes:

$$\Sigma_{x=1}^{N}\Sigma_{y=1}^{N} \min(|p(x,y)-p(x+1,y)|,|p(x,y)-p(x,y+1)|) \quad (4)$$

Similarly, the when pixels outside of the local area 1602 are considered, the computation described in Equation (4) may be instead described as shown in Equation (5):

$$\sum_{x=1}^{N}\sum_{y=1}^{N} \min\binom{|p(x,y)-p(x-1,y)|, |p(x,y)-p(x,y-1)|,}{|p(x,y)-p(x+1,y)|, |p(x,y)-p(x,y+1)|} \quad (5)$$

Figure 20:
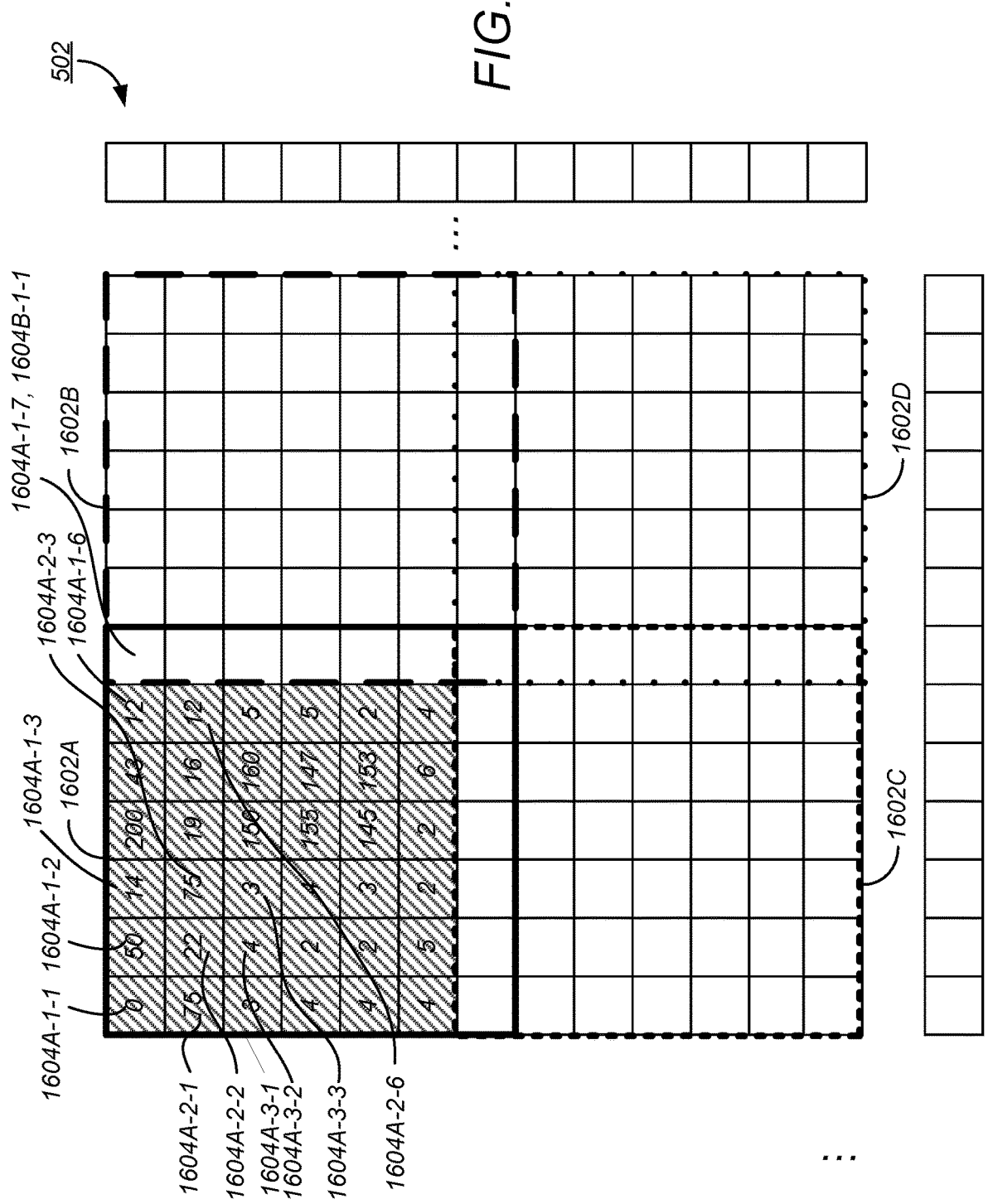
FIG. 20 is a diagram illustrating an embodiment of overlapping local areas.

FIG. 20 is a diagram illustrating an embodiment of overlapping local areas 1602 (e.g. some pixels are members of more than one local area 1602. In the illustrated embodiment, local area 1602A is indicated by a solid thick line, while overlapping local areas 1602B-1602D are indicated by variously dashed thick lines. In this case, the reference pixels (indicated by shading) do not include all of the pixels in the (overlapping) local areas 1602, but since the local areas 1602 overlap, all of the pixels of the all 4 local areas 1602A-1602D will be designated as a reference pixel and the minimum difference computed between adjacent pixels. For example, consider pixel 1604A-1-7 (the last pixel in the top row of local area 1604A). This pixel is not a reference pixel for computation of local activity of local area 1604A, but is included within local area 1604A. However, this pixel is also the first pixel in the top row of (overlapping) local area 1604B (hence also designated 1604B-1-1) and is a reference pixel for computation of the local activity of local area 1604B.

Equivalently, the computation of the local activity may be restricted to the local area 1602, but the local areas 1602 may overlap so that fewer of the pixels in the local area 1602 are designated as reference pixels, but all of the pixels in the local area 1602 are used to compute the local activity.

Hardware Environment

Figure 21:
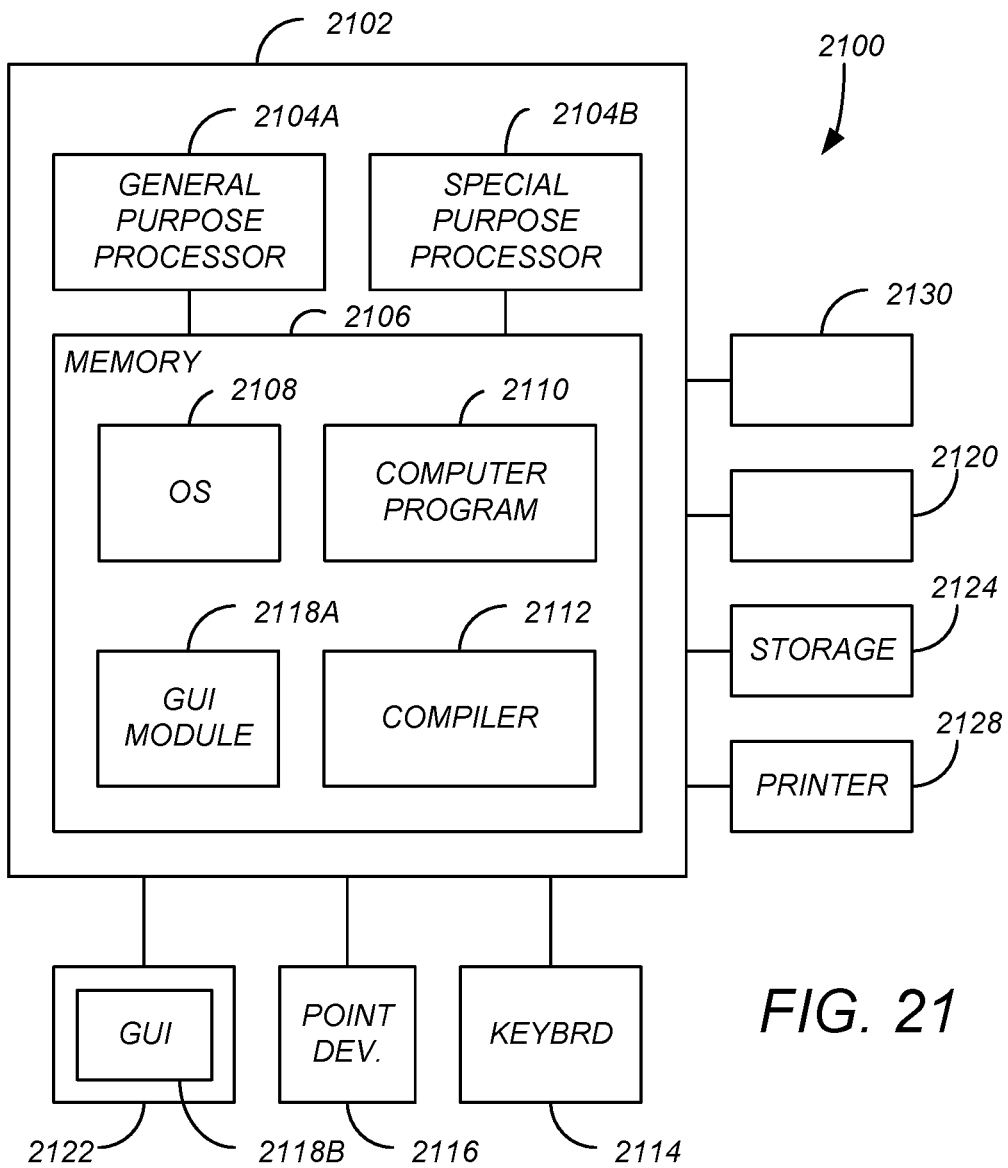
FIG. 21 is a diagram illustrating an exemplary computer system that could be used to implement elements of this disclosure.

FIG. 21 is a diagram illustrating an exemplary computer system 2100 that could be used to implement elements of the present invention, including the encoding controller 218 or other device computing the relationship between encoding parameters and target decoding device decoding costs and selecting encoding parameters to minimize encoding costs including target decoding device decoding costs. The exemplary computer system 2100 may also be used to encode the uncoded video 102 according to the selected encoding parameters or to decode the coded video.

The computer 2102 comprises a general purpose hardware processor 2104A and/or a special purpose hardware processor 2104B (hereinafter alternatively collectively referred to as processor 2104) and a memory 2106, such as random access memory (RAM). The computer 2102 may be coupled to other devices, including input/output (I/O) devices such as a keyboard 2114, a mouse device 2116 and a printer 2128.

In one embodiment, the computer 2102 operates by the general purpose processor 2104A performing instructions defined by the computer program 2110 under control of an operating system 2108. The computer program 2110 and/or the operating system 2108 may be stored in the memory 2106 and may interface with the user and/or other devices to accept input and commands and, based on such input and commands and the instructions defined by the computer program 2110 and operating system 2108 to provide output and results.

Output/results may be presented on the display 2122 or provided to another device for presentation or further processing or action. In one embodiment, the display 2122 comprises a liquid crystal display (LCD) having a plurality of separately addressable pixels formed by liquid crystals. Each pixel of the display 2122 changes to an opaque or translucent state to form a part of the image on the display in response to the data or information generated by the processor 2104 from the application of the instructions of the computer program 2110 and/or operating system 2108 to the input and commands. Other display 2122 types also include picture elements that change state in order to create the image presented on the display 2122. The image may be provided through a graphical user interface (GUI) module 2118A. Although the GUI module 2118A is depicted as a separate module, the instructions performing the GUI functions can be resident or distributed in the operating system 2108, the computer program 2110, or implemented with special purpose memory and processors.

Some or all of the operations performed by the computer 2102 according to the computer program 2110 instructions may be implemented in a special purpose processor 2104B. In this embodiment, some or all of the computer program 2110 instructions may be implemented via firmware instructions stored in a read only memory (ROM), a programmable read only memory (PROM) or flash memory within the special purpose processor 2104B or in memory 2106. The special purpose processor 2104B may also be hardwired through circuit design to perform some or all of the operations to implement the present invention. Further, the special purpose processor 2104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 2102 may also implement a compiler 2112 which allows an application program 2110 written in a programming language such as COBOL, C++, FORTRAN, or other language to be translated into processor 2104 readable code. After completion, the application or computer program 2110 accesses and manipulates data accepted from I/O devices and stored in the memory 2106 of the computer 2102 using the relationships and logic that was generated using the compiler 2112.

The computer 2102 also optionally comprises an external communication device such as a modem, satellite link, Ethernet card, or other device for accepting input from and providing output to other computers.

In one embodiment, instructions implementing the operating system 2108, the computer program 2110, and/or the compiler 2112 are tangibly embodied in a computer-readable medium, e.g., data storage device 2120, which could include one or more fixed or removable data storage devices, such as a zip drive, floppy disc drive 2124, hard drive, CD-ROM drive, tape drive, or a flash drive. Further, the operating system 2108 and the computer program 2110 are comprised of computer program instructions which, when accessed, read and executed by the computer 2102, causes the computer 2102 to perform the steps necessary to implement and/or use the present invention or to load the program of instructions into a memory, thus creating a special purpose data structure causing the computer to operate as a specially programmed computer executing the method steps described herein. Computer program 2110 and/or operating instructions may also be tangibly embodied in memory 2106 and/or data communications devices 2130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 2102.

Although the term "computer" is referred to herein, it is understood that the computer may include portable devices such as cellphones, portable MP3 players, video game consoles, notebook computers, pocket computers, or any other device with suitable processing, communication, and input/output capability.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of determining local activity to enable coding in at least a portion of a coding unit, comprising:
    for each pixel in the at least the portion of the coding unit, determining a difference between the pixel and neighboring pixels, wherein each of the neighboring pixels are adjacent pixels; and
    determining the local activity at least in part according to a sum of the differences between each pixel of the at least a portion of the coding unit and the neighboring pixels;
    wherein determining a sum of the differences comprises determining a minimum difference between the pixel and the neighboring pixels,
    wherein determining the minimum difference between the pixel and neighboring pixels for each pixel in the coding unit comprises:
        (a) segmenting the coding unit into a plurality of non-overlapping local areas of the same pixel dimension;
        (b) identifying a plurality of reference pixels in the local area;
        (c) for each reference pixel in the local area, determining a minimum difference between the reference pixel and at least two adjacent pixels; and
        (d) repeating (b) and (c) for each local area of the coding unit, and
    wherein determining the local activity uses the determining the minimum difference by accumulating the minimum difference for each of the local areas of the coding unit in the sum of differences calculation for determining the local activity,
    wherein the determination of the local activity is used in HEVC coding to remove redundant information in a bitstream containing the pixels being coded,
    wherein the local area comprises N×N pixels,
    wherein identifying a plurality of reference pixels in the local area comprises identifying the reference pixels as the first N−1 rows of pixels and the first N−1 columns of pixels, and
    wherein determining the local activity at least in part according to a sum of the differences between each pixel and the neighboring pixels comprises determining the local activity according to:

$$\sum_{x=1}^{N-1}\sum_{y=1}^{N-1} \min(|p(x, y) - p(x+1, y)|, |p(x, y) - p(x, y+1)|);$$

wherein:
        x denotes the row and y denotes the column of each pixel p in the local area,
        p denotes the pixel intensity at location (x, y); and
        min(operand 1, operand 2) denotes the minimum of operand 1 and operand 2.

2. The method of claim 1, wherein:
    the local area comprises N×N pixels; and
    identifying a plurality of reference pixels in the local area comprises:
        identifying the reference pixels as the middle N−2 columns of pixels and the N−2 rows of pixels.

3. The method of claim 2, wherein determining the local activity at least in part according to a sum of the differences between each pixel and the neighboring pixels comprises determining the local activity according to:

$$\sum_{x=2}^{N-1} \sum_{y=2}^{N-1} \min(|p(x, y) - p(x-1, y)|, |p(x, y) - p(x, y-1)|,$$
$$|p(x, y) - p(x+1, y)|, |p(x, y) - p(x, y+1)|); \quad (5)$$

wherein:
- x denotes the row and y denotes the column of each pixel p in the local area;
- p denotes the pixel intensity at location (x, y); and
- min(operand 1, operand 2, operand 3, operand 4) denotes the minimum of operand 1, operand 2, operand 3, and operand 4.

\* \* \* \* \*